United States Patent
Yamagishi

(10) Patent No.: US 6,826,441 B2
(45) Date of Patent: Nov. 30, 2004

(54) METHOD AND SYSTEM FOR MANAGEMENT TO MANUFACTURING PROCESS FOR PRODUCTS

(75) Inventor: Masayuki Yamagishi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 672 days.

(21) Appl. No.: 09/759,466

(22) Filed: Jan. 16, 2001

(65) Prior Publication Data

US 2001/0018623 A1 Aug. 30, 2001

(30) Foreign Application Priority Data

Jan. 13, 2000 (JP) ...................................... 2000-009962

(51) Int. Cl.⁷ ............................................. G06F 19/00
(52) U.S. Cl. ........................ 700/121; 700/100; 705/28
(58) Field of Search ............................... 700/121, 100, 700/101–102, 97, 99, 213, 216, 96; 414/785, 803

(56) References Cited

U.S. PATENT DOCUMENTS

| | | | |
|---|---|---|---|
| 5,024,570 A | * 6/1991 | Kiriseko et al. | 414/222.06 |
| 5,282,139 A | * 1/1994 | Kobayashi | 700/101 |
| 5,619,409 A | * 4/1997 | Schultz et al. | 700/17 |
| 5,997,656 A | * 12/1999 | Kim | 134/18 |

FOREIGN PATENT DOCUMENTS

| | | |
|---|---|---|
| EP | 0 359 525 A2 | 3/1990 |
| EP | 0 487 419 A2 | 5/1992 |
| JP | A 3-236213 | 10/1991 |
| JP | A 5-218177 | 8/1993 |
| JP | A 9-148210 | 6/1997 |
| JP | A 11-297785 | 10/1999 |
| KR | 1998-077237 | 11/1998 |

* cited by examiner

Primary Examiner—Kidest Bahta
(74) Attorney, Agent, or Firm—Young & Thompson

(57) ABSTRACT

The present invention provides a system for managing a manufacturing processes including at least a batch-process for a batch which comprises plural product lots. The system comprises: a host computer; at least a batch-manufacturing apparatus for carrying out a batch-process under control of the host computer; at least a stoker for storing the plural product lots; at least a carrier for carrying the plural product lots between the batch-manufacturing apparatus and the stoker under control of the host computer, wherein a loading request is transferred from the batch-manufacturing apparatus to a host computer, and the host computer retrieves batch-processable product lots to form a batch of plural batch-processable product lots, and the batch-manufacturing apparatus verifies whether or not a lot number of the batch reaches a predetermined maximum batch-lot number, and an additional loading request is sent from the batch-manufacturing apparatus to the host computer, and the host computer is further retrieved whether or not any further additional batch-processable product lot is present, and the additional batch-processable product lot is carried to the batch-manufacturing apparatus to add the additional batch-processable product lot to the batch.

11 Claims, 9 Drawing Sheets

METHOD AND SYSTEM FOR MANAGEMENT TO MANUFACTURING PROCESS FOR PRODUCTS

BACKGROUND OF THE INVENTION

The present invention relates to a method and a system for management to manufacturing semiconductor devices, and more particularly to a manufacturing management method and a manufacturing management system provided in a manufacturing factory for managing manufacturing processes for manufacturing industrial products, wherein batch-processes in lot-units are implemented.

In a semiconductor manufacturing factory for manufacturing semiconductor devices, plural semiconductor wafers are accommodated as one lot in a carriage, and batch processes for the plural semiconductor wafers are made in the lot unit. Photo-lithography processes are typical processes for manufacturing the semiconductor devices. In accordance with the photo-lithography processes, a photo-resist film is applied on each of the semiconductor wafers, and an exposure process is carried out to the photo-resist film and a subsequent development is made to form a photo-resist pattern over each of the semiconductor wafers. Each of the semiconductor wafers is then subjected to a dry etching by use of the photo-resist pattern as a mask. The above sequential processes are single wafer processes for processing individual single semiconductor wafers sequentially. By contrast, the deposition processes such as the chemical vapor deposition processes and the heat treatment such as annealing for causing a diffusion of impurity ion-implanted are the batch processes for processing the plural semiconductor wafers concurrently. The manufacturing processes for the semiconductor devices include both the single wafer processes and the batch-processes. It is, therefore, possible that the plural semiconductor wafers are sequentially subjected to the single wafer processes before the sequentially processed semiconductor wafers are then concurrently subjected to the batch process. It is also possible that the plural semiconductor wafers are concurrently subjected to the batch process before the batch-processes plural semiconductor wafers are sequentially subjected to the single wafer processes. It is also possible that the same process such as the diffusion process is carried out in plural times on different steps in the sequential manufacturing processes. This means it possible that the plural semiconductor wafers of one lot and the other plural semiconductor wafers of different lot are concurrently subjected to the batch-process such as the diffusion process or the chemical vapor deposition process.

FIG. 1 is a schematic diagram illustrative of the conventional facilities on the semiconductor manufacturing line in the semiconductor manufacturing factory. The conventional facilities comprise a circulated carrier carriage rail 501 on which a plurality of carrier carriage 500 is moved, and a plurality of blocks BL1, BL2, BL3, BL4, BL5, BL6, BL7 and BL8. Each of the blocks BL1, BL2, BL3, BL4, BL5, BL6, BL7 and BL8 has plural and various manufacturing apparatus 300 for performing predetermined manufacturing processes to the semiconductor wafers and two wafer stokers 200 for stocking the plural semiconductor wafers. Automatic carrier cars 400 are moved in each of the blocks BL1, BL2, BL3, BL4, BL5, BL6, BL7 and BL8 for carrying the plural semiconductor wafers in one or more lot units among the plural and various manufacturing apparatus 300. The automatic carrier cars 400 picks up the one or more unprocessed wafer lots from the stoker 200 to carry the same to the individual manufacturing apparatus 300 for the individual processes. Further, the automatic carrier cars 400 picks up the one or more processed wafer lots from the individual manufacturing apparatus 300 to carry the same to the stoker 200 for accommodating the same therein. Each of the stokers 200 in each of the blocks BL1, BL2, BL3, BL4, BL5, BL6, BL7 and BL8 is connected with the circulated carrier carriage rail 501 on which the carrier carriages 500 are moved among the individual blocks BL1, BL2, BL3, BL4, BL5, BL6, BL7 and BL8 for carrying the wafer lots from the stokers of one block to other stokers of different block to allow the processed wafer lots in the one block to be further subjected to the different processes in the different blocks.

The above various semiconductor manufacturing apparatus are classified into two types, for example, the batch-processing apparatus and the single-wafer-processing apparatus. In each of the blocks BL1, BL2, BL3, BL4, BL5, BL6, BL7 and BL8, the one or more wafer lots are picked up by the automatic carrier cars 400 from the stoker 200 and then carried into the semiconductor manufacturing apparatus in the same block. It is necessary for the semiconductor manufacturing system to manage the processings of the wafer lots, for which purposes, a host computer is provided for controlling the stokers 200, the individual manufacturing apparatuses 300 and the automatic carrier cars 400. Namely, the management is made mainly by the host computer.

FIG. 2 is a schematic view illustrative of a conventional management method, in accordance with which the host computer controls the stokers, the individual manufacturing apparatuses and the automatic carrier cars. FIG. 3 is a timing chart illustrative of operations of the conventional management method, in accordance with which the host computer controls the stokers, the individual manufacturing apparatuses and the automatic carrier cars. It is assumed that a manufacturing apparatus 301(300) be the batch-processing apparatus which is capable of batch-processing the plural wafer lots. A maximum batch lot number is 4. Namely, the manufacturing apparatus 301(300) is capable of batch-processing four wafer lots at its maximum. The manufacturing apparatus 301(300) has an internal tray 30 which is divided into a first tray 31 for storing wafer lots and a second ray 32 for storing other wafer lots. The wafer lots stored in the first tray 31 and the other wafer lots stored in the second ray 32 are alternately subjected to the batch-process. Each of the first and second trays 31 and 32 has a capacity of storing the four wafer lots as the maximum lot number.

In a first step S501, after the current batch-process has been completed by the manufacturing apparatus 301(300), then the processed wafer lots are returned to carriers of the second tray 32 and further the automatic carrier car 400 carries the processed wafer lots into the stoker 200. The wafer lots stored in the first tray 31 are carried to a processor not illustrated, and then an loading request for carrying the wafer lots to be subjected to the batch-processing from the stoker 200 to the manufacturing apparatus 301(300) is sent to the host computer 100.

In a second step S502, the host computer 100 determines a single wafer lot in accordance with the dispatch rule. The host computer 100 further retrieves the determined single wafer lot and other wafer lots which are allowable to be batch-processed to form a single batch unit. If the number of the wafer lots in the batch unit is less than the maximum batch number, then the extent of the retrieval is expanded to the other stokers of the other blocks, so that the host computer 100 further retrieves the one or more wafer lots which are allowable to be batch-processed. The retrieved wafer lots are then carried by the carrier carriage to the subjected block to enable formation of the batch of the maximum number of the wafer lots. After the batch has been established, the host computer 100 sends the manufacturing apparatus 301(300) a notice of the objected wafer lots to be batch-processed.

In a third step S503, upon receipt of the notice of the objected wafer lots to be batch-processed, the manufacturing apparatus 301(300) sends the host computer 100 a load request for loading the wafer lots in the batch unit.

In a fourth step S504, upon receipt of the load request, the host computer 100 controls the automatic carrier car 400 so that the automatic carrier car 400 carries the objected wafer lots from the stoker 200 to the manufacturing apparatus 301(300), and the wafer lots are then stored in the second tray 32 in the manufacturing apparatus 301(300). As described above, the number of the wafer lots in the batch unit is 4. The automatic carrier car 400 carries two wafer lots at one time. Namely, the automatic carrier car 400 carries the four wafer lots by two carrying operations. As shown in FIG. 3, if three wafer lots "A", "B", and "C" are retrieved to form the single batch-unit, then the automatic carrier car 400 carries the two wafer lots "A" and "B" by the first carrying operation and then the automatic carrier car 400 carries the remaining wafer lot "C" by the second carrying operation. The load requests are sent from the manufacturing apparatus 301(300) to the host computer 100 every times when the automatic carrier car 400 carries the wafer lots.

In a fifth step S505, after all of the wafer lots forming the batch-unit have been accommodated or stored in the second tray 32 in the manufacturing apparatus 301(300), then the manufacturing apparatus 301(300) sends the host computer 100 an input inhibiting request, whereby the operations for storing the wafer lots are finished.

To carry the wafer lots from the stoker 200, the host computer 100 sends the stoker 200 a put-out instruction in a step S506. After the wafer lots have been put out of the stoker 200, the stoker 200 sends the host computer a put-out report in a step S507.

In accordance with the conventional managing system, the next wafer lots to be batch-processed in the next cycle are stored in the second tray in the manufacturing apparatus and then the manufacturing apparatus transmits the input inhibiting request to the host computer to finish the storage operations, before the manufacturing apparatus performing the batch-process to those stored wafer lots forming the batch-unit. For this reason, once the storage operations of the wafer lots to be subjected to the next time batch-processing have been finished, it is impossible to add any additional wafer lot to the stored wafer lots in the second tray of the manufacturing apparatus even the additional wafer lot allowable to be processed in the same batch-processing could have been carried into the stoker from the other manufacturing apparatus in the same block or the other manufacturing apparatus in the other block. If the number of the wafer lots forming the batch-unit does not reach the maximum wafer lot number, and if any new wafer lot is allowable to be subjected to the same batch-process, then it is, however, impossible to add the new wafer lot to the wafer lots forming the batch-unit. Namely, the new wafer lot has to be unwillingly subjected to the further later batch-process. This reduces the batch filling rate and also the throughput of all of the manufacturing apparatuses.

In Japanese laid-open patent publication No. 3-23621, it is disclosed that the control unit decides the maximum lot number of the batch-unit and previously confirm individual priorities of the transfer states, the process conditions, the process time periods of the individual samples, so as to order the individual samples in the priority order. If the lot number reaches the maximum lot number, then the batch of the lots is formed and inputted into the manufacturing apparatus. If the lot number reaches the maximum lot number, then it is verified whether or not it is possible to add a sample to the batch on the basis of an expected arrival time of the sample from the transfer state, the processing time period and the priority order. If possible, the sample is added to the batch for subsequent input into the manufacturing apparatus to improve the efficiency of the batch-processing.

The above conventional technique disclosed in the Japanese publication utilizes the control unit to confirm the wafer processing states of the individual manufacturing apparatus and also the wafer states for subsequent operations of transferring the wafers to be processed to the individual manufacturing apparatus. In case that the system includes many manufacturing apparatuses and many stokers, the host computer grasps all states of the wafer lots of the individual manufacturing apparatuses and the individual stokers, for which reason the host computer has a tremendously large load. The host computer is needed to have a large capacity and a high speed performance. The necessary programs of the host computer is also complicated. The load for maintenance to the host computer is large.

In Japanese laid-open patent publication No. 8-236413, it is disclosed that a central unit is provided for the plural manufacturing apparatuses and trays, wherein the central unit comprises a progress-state comparing and calculating unit, a manufacturing apparatus state monitoring unit, a stock management unit, and a tray control unit. The central unit monitors all of the manufacturing apparatuses and decides the wafers to be processes at the next time on the basis of the timing signals, and then the automatic retrieval of the wafers as decided is made for subsequent processing the decided wafers by the manufacturing apparatus. The retrieval to the wafers is made before the timing of processings the wafers in the manufacturing apparatuses to improve the efficiency of the wafer processings.

The above conventional technique disclosed in the Japanese publication utilizes the central unit to confirm the wafer processing states of the individual manufacturing apparatus and also the wafer states for subsequent operations of transferring the wafers to be processed to the individual manufacturing apparatus. In case that the system includes many manufacturing apparatuses and many stokers, the host computer grasps all states of the wafer lots of the individual manufacturing apparatuses and the individual stokers, for which reason the host computer has a tremendously large load. The host computer is needed to have a large capacity and a high speed performance. The necessary programs of the host computer is also complicated. The load for maintenance to the host computer is large.

In the above circumstances, it had been required to develop a novel system and method of maintenance to manufacturing semiconductor devices free from the above problem.

SUMMARY OF THE INVENTION

Accordingly, it is an object of the present invention to provide a novel manufacturing maintenance system having many manufacturing apparatus and stokers free from the above problems.

It is a further object of the present invention to provide a novel manufacturing maintenance system having many manufacturing apparatus and stokers, which improves efficiency in batch-processing of the wafers without increasing the load to the host computer.

It is a still further object of the present invention to provide a novel manufacturing maintenance system having many manufacturing apparatus and stokers, which improves efficiency in batch-processing of the wafers without complicated programs for the host computer.

It is yet a further object of the present invention to provide a novel manufacturing maintenance method applied to the manufacturing maintenance system having many manufacturing apparatus and stokers free from the above problems.

It is a further object of the present invention to provide a novel manufacturing maintenance method applied to the manufacturing maintenance system having many manufacturing apparatus and stokers, which improves efficiency in batch-processing of the wafers without increasing the load to the host computer.

It is a still further object of the present invention to provide a novel manufacturing maintenance method applied to the manufacturing maintenance system having many manufacturing apparatus and stokers, which improves efficiency in batch-processing of the wafers without complicated programs for the host computer.

The present invention provides a system for managing a manufacturing processes including at least a batch-process for a batch which comprises plural product lots. The system comprises: a host computer; at least a batch-manufacturing apparatus for carrying out a batch-process under control of the host computer; at least a stoker for storing the plural product lots; at least a carrier for carrying the plural product lots between the batch-manufacturing apparatus and the stoker under control of the host computer, wherein a loading request is transferred from the batch-manufacturing apparatus to a host computer, and the host computer retrieves batch-processable product lots to form a batch of plural batch-processable product lots, and the batch-manufacturing apparatus verifies whether or not a lot number of the batch reaches a predetermined maximum batch-lot number, and an additional loading request is sent from the batch-manufacturing apparatus to the host computer, and the host computer is further retrieved whether or not any further additional batch-processable product lot is present, and the additional batch-processable product lot is carried to the batch-manufacturing apparatus to add the additional batch-processable product lot to the batch.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
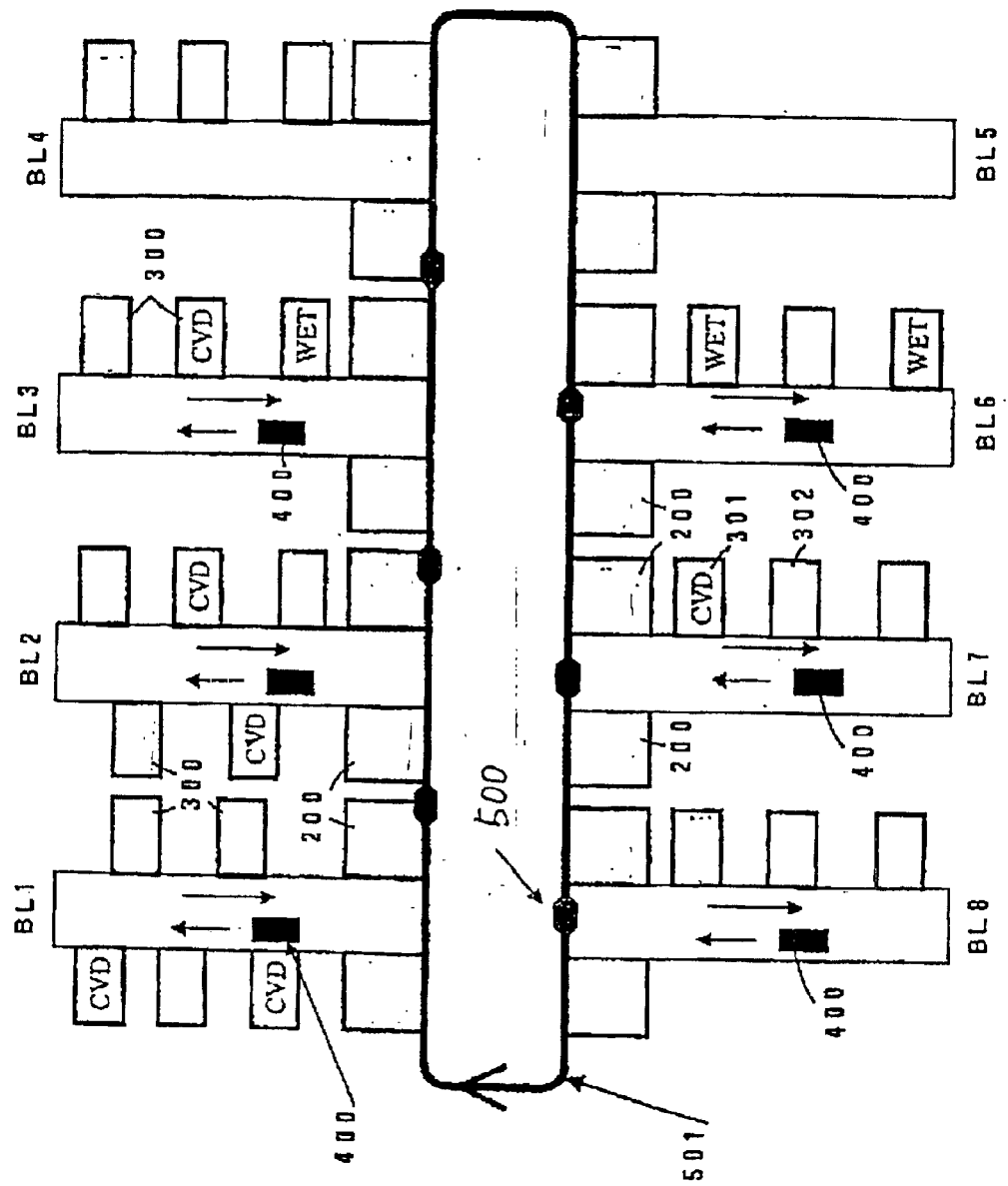
FIG. 1 is a schematic diagram illustrative of the conventional facilities on the semiconductor manufacturing line in the semiconductor manufacturing factory.
Figure 2:
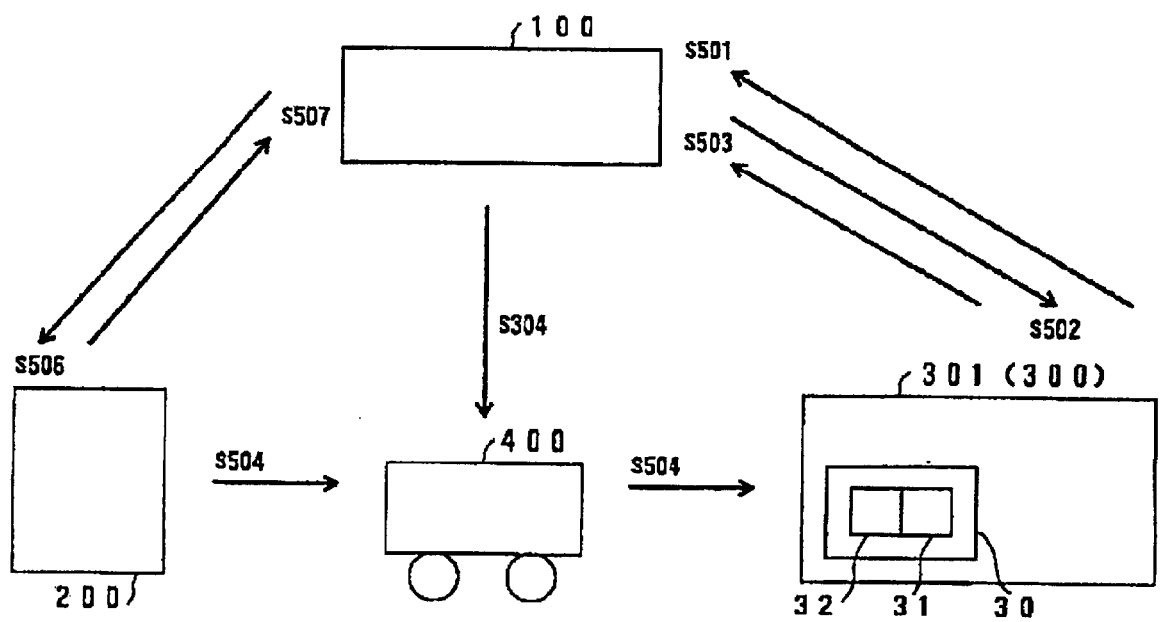
FIG. 2 is a schematic view illustrative of a conventional management method, in accordance with which the host computer controls the stokers, the individual manufacturing apparatuses and the automatic carrier cars.
Figure 3:
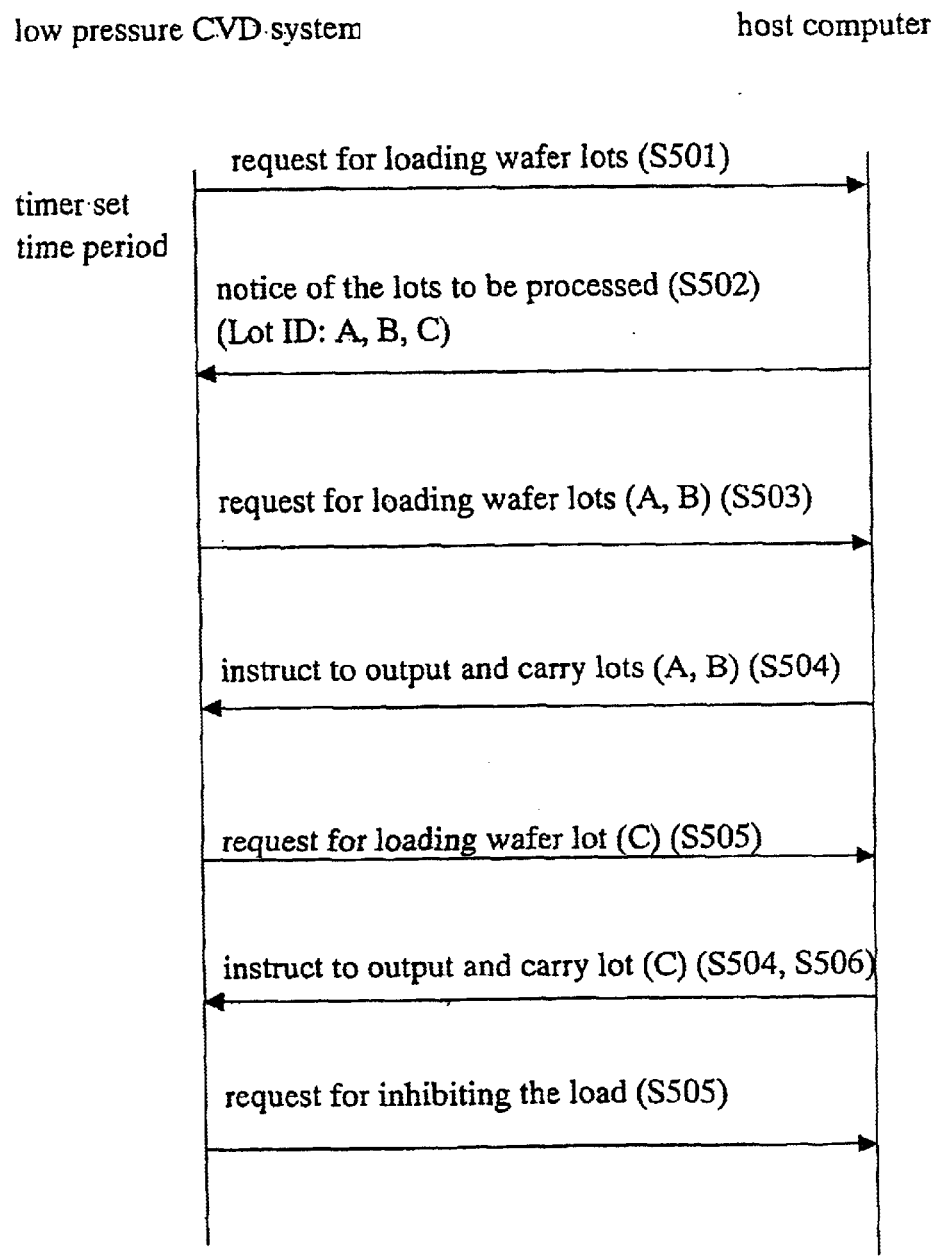
FIG. 3 is a timing chart illustrative of operations of the conventional management method, in accordance with which the host computer controls the stokers, the individual manufacturing apparatuses and the automatic carrier cars.

The first present invention provides a method of managing manufacturing processes including at least a batch-process for a batch which comprises plural product lots by at least a batch-manufacturing apparatus. The method comprises the steps of: transferring a loading request from the batch-manufacturing apparatus to a host computer; retrieving batch-processable product lots by the host computer to form a batch of plural batch-processable product lots ; carrying the batch to the batch-manufacturing apparatus; verifying by the batch-manufacturing apparatus whether or not a lot number of the batch reaches a predetermined maximum batch-lot number; sending an additional loading request from the batch-manufacturing apparatus to the host computer; retrieving by the host computer whether or not any further additional batch-processable product lot is present; and carrying the additional batch-processable product lot to the batch-manufacturing apparatus to add the additional batch-processable product lot to the batch.

It is preferable that the additional loading request is repeatedly sent to the host computer until the lot number of the batch reaches the predetermined maximum batch-lot number.

It is preferable that a delete request for deleting the additional loading request is sent from the batch-manufacturing apparatus to the host computer either when the lot number of the batch reaches the predetermined maximum batch-lot number or when a transmission of the additional loading request is not in time for initiating the batch-process by the batch-manufacturing apparatus.

It is also preferable that the product comprises a semiconductor wafer, and one of the product lots comprises a plurality of the semiconductor wafer, and one of the batches comprises a plurality of the semiconductor wafer lot.

It is further preferable that the batch-manufacturing apparatus is capable of batch-processing the plural semiconductor wafers in the single batch.

The second present invention provides a system for managing a manufacturing processes including at least a batch-process for a batch which comprises plural product lots. The system comprises: a host computer; at least a batch-manufacturing apparatus for carrying out a batch-process under control of the host computer; at least a stoker for storing the plural product lots; at least a carrier for carrying the plural product lots between the batch-manufacturing apparatus and the stoker under control of the host computer, wherein a loading request is transferred from the batch-manufacturing apparatus to a host computer, and the host computer retrieves batch-processable product lots to form a batch of plural batch-processable product lots, and the batch-manufacturing apparatus verifies whether or not a lot number of the batch reaches a predetermined maximum batch-lot number, and an additional loading request is sent from the batch-manufacturing apparatus to the host computer, and the host computer is further retrieved whether or not any further additional batch-processable product lot is present, and the additional batch-processable product lot is carried to the batch-manufacturing apparatus to add the additional batch-processable product lot to the batch.

It is preferable that the additional loading request is repeatedly sent to the host computer until the lot number of the batch reaches the predetermined maximum batch-lot number.

It is also preferable that a delete request for deleting the additional loading request is sent from the batch-manufacturing apparatus to the host computer either when the lot number of the batch reaches the predetermined maximum batch-lot number or when a transmission of the additional loading request is not in time for initiating the batch-process by the batch-manufacturing apparatus.

It is also preferable that the system has plural blocks, each of which has at least one of the stoker and the batch-manufacturing apparatus, and at least one of the carrier is allocated to each of the plural blocks, and the host computer retrieves the wafer lots in each of the plural blocks and also controls each of the carriers in each of the plural blocks.

It is also preferable that the product comprises a semiconductor wafer, and one of the product lots comprises a plurality of the semiconductor wafer, and one of the batches comprises a plurality of the semiconductor wafer lot.

It is further preferable that the batch-manufacturing apparatus is capable of batch-processing the plural semiconductor wafers in the single batch.

PREFERRED EMBODIMENT

Figure 4:
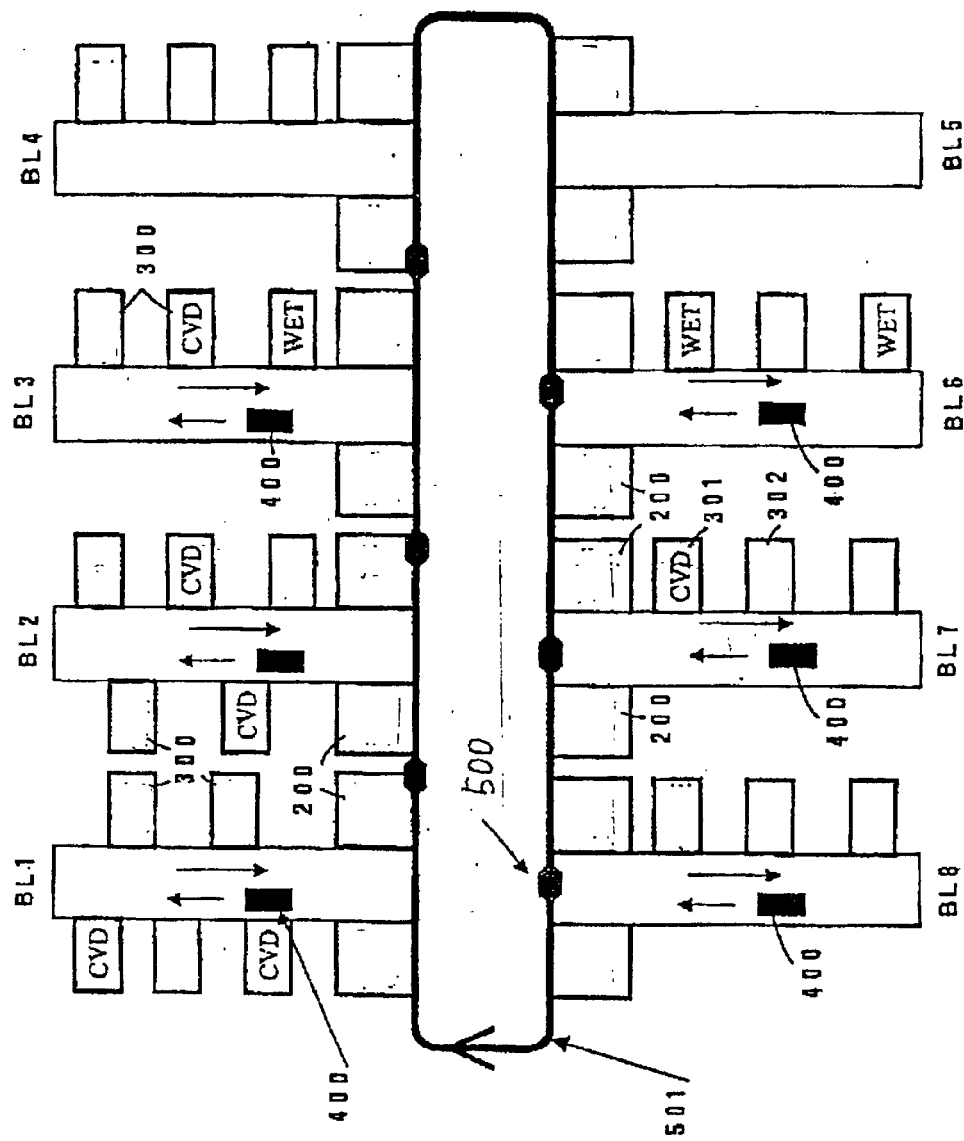
FIG. 4 is a schematic diagram illustrative of the facilities on the semiconductor manufacturing line in the semiconductor manufacturing factory for the novel manufacturing management system in a first embodiment in accordance with the present invention.

A first embodiment according to the present invention will be described in detail with reference to the drawings. FIG. 4 is a schematic diagram illustrative of the facilities on the semiconductor manufacturing line in the semiconductor manufacturing factory for the novel manufacturing management system in a first embodiment in accordance with the present invention. The facilities comprise a circulated carrier carriage rail 501 on which a plurality of carrier carriage 500 is moved, and a plurality of blocks BL1, BL2, BL3, BL4, BL5, BL6, BL7 and BL8. Each of the blocks BL1, BL2, BL3, BL4, BL5, BL6, BL7 and BL8 has plural and various manufacturing apparatus 300 for performing predetermined manufacturing processes to the semiconductor wafers and two wafer stokers 200 for stocking the plural semiconductor wafers. Automatic carrier cars 400 are moved in each of the blocks BL1, BL2, BL3, BL4, BL5, BL6, BL7 and BL8 for carrying the plural semiconductor wafers in one or more lot units among the plural and various manufacturing apparatus 300. The automatic carrier cars 400 picks up the one or more unprocessed wafer lots from the stoker 200 to carry the same to the individual manufacturing apparatus 300 for the individual processes. Further, the automatic carrier cars 400 picks up the one or more processed wafer lots from the individual manufacturing apparatus 300 to carry the same to the stoker 200 for accommodating the same therein. Each of the stokers 200 in each of the blocks BL1, BL2, BL3, BL4, BL5, BL6, BL7 and BL8 is connected with the circulated carrier carriage rail 501 on which the carrier carriages 500 are moved among the individual blocks BL1, BL2, BL3, BL4, BL5, BL6, BL7 and BL8 for carrying the wafer lots from the stokers of one block to other stokers of different block to allow the processed wafer lots in the one block to be further subjected to the different processes in the different blocks.

The above various semiconductor manufacturing apparatus are classified into two types, for example, the batch-processing apparatus and the single-wafer-processing apparatus. In each of the blocks BL1, BL2, BL3, BL4, BL5, BL6, BL7 and BL8, the one or more wafer lots are picked up by the automatic carrier cars 400 from the stoker 200 and then carried into the semiconductor manufacturing apparatus in the same block. It is necessary for the semiconductor manufacturing system to manage the processings of the wafer lots, for which purposes, a host computer is provided for controlling the stokers 200, the individual manufacturing apparatuses 300 and the automatic carrier cars 400. Namely, the management is made mainly by the host computer.

Figure 5:
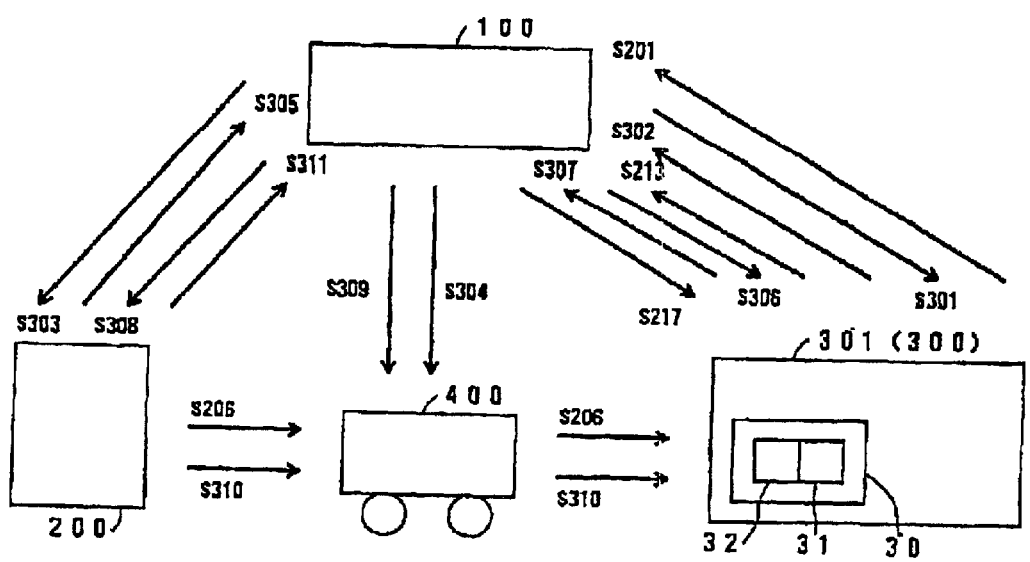

FIG. 5 is a schematic view illustrative of a novel manufacturing management method, in accordance with which the host computer controls the stokers, the individual manufacturing apparatuses and the automatic carrier cars in a first embodiment in accordance with the present invention. The block BL7 is taken as an example, wherein the block BL7 has the two stokers 200, a low pressure chemical vapor deposition system 301 as one of the manufacturing apparatus, a cleaning apparatus 302 as another of the manufacturing apparatus. The automatic carrier carriage 400 carries the wafer lots among the stoker 200, the low pressure chemical vapor deposition system 301, and the cleaning apparatus 302, wherein the automatic carrier carriage 400 is controlled by the host computer 100. The cleaning apparatus 302 performs the cleaning operation by use of a mixing solution of H2O2 and NH4OH at a temperature of 10° C. The low pressure chemical vapor deposition system 301 performs a deposition process for depositing a CVD film such as a silicon oxide film or a silicon nitride film over the wafers at a deposition temperature of 600° C. It is assumed that the manufacturing apparatus 301(300) be the batch-processing apparatus, for example, the low pressure chemical vapor deposition system, which is capable of batch-processing the plural wafer lots. A maximum batch lot number is 4. Namely, the manufacturing apparatus 301(300) is capable of batch-processing four wafer lots at its maximum. The manufacturing apparatus 301(300) has an internal tray 30 which is divided into a first tray 31 for storing wafer lots and a second ray 32 for storing other wafer lots. The wafer lots stored in the first tray 31 and the other wafer lots stored in the second ray 32 are alternately subjected to the batch-process. Each of the first and second trays 31 and 32 has a capacity of storing the four wafer lots as the maximum lot number.

Figure 6:
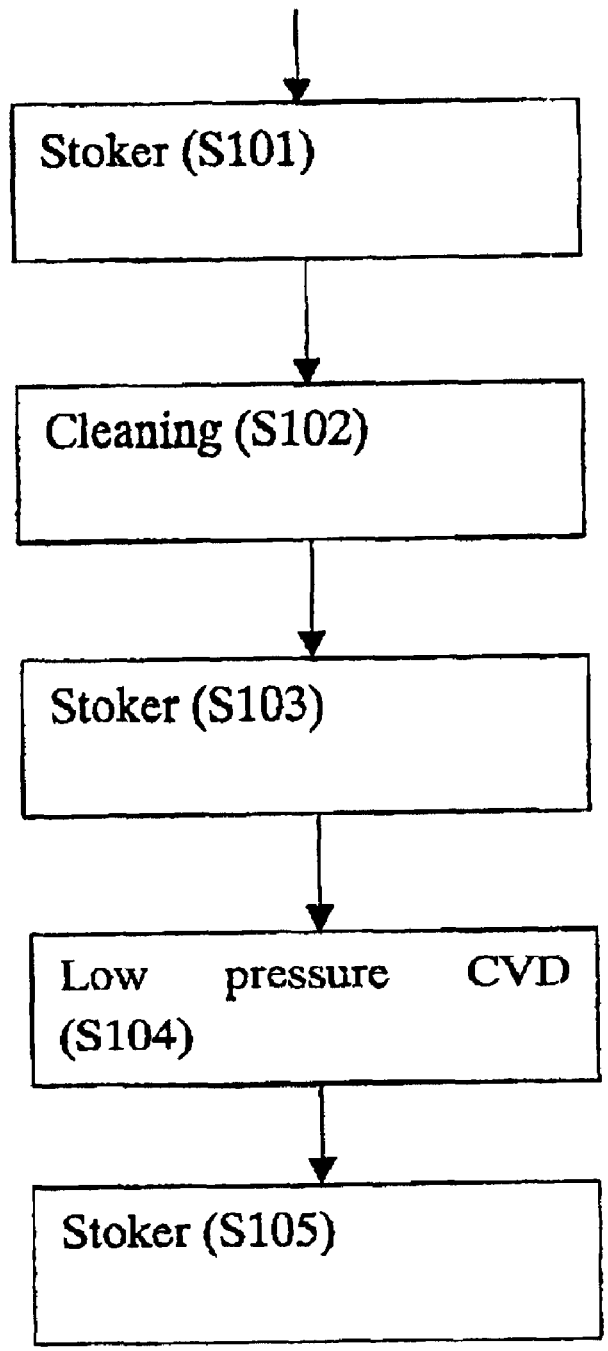
FIG. 6 is a schematic flow chart illustrative of sequential manufacturing processings of the wafers, for example, the cleaning process and subsequent low pressure chemical vapor deposition process.

FIG. 6 is a schematic flow chart illustrative of sequential manufacturing processings of the wafers, for example, the cleaning process and subsequent low pressure chemical vapor deposition process.

In a first step S101, one wafer lot in the stoker 200 is carried by the automatic carrier carriage 400 to the cleaning apparatus 302.

In a second step S102, the wafers are subjected to the cleaning process in the cleaning apparatus 302.

In a third step S103, the wafers are then carried by the automatic carrier carriage 400 from the cleaning apparatus 302 to the stoker 200, and then the wafers are further carried by the automatic carrier carriage 400 from stoker 200 to the low pressure chemical vapor deposition system 301.

In a fourth step S104, the wafers are subjected to the low pressure chemical vapor deposition process by the low pressure chemical vapor deposition system 301.

In a fifth step S105, the wafers are then carried by the automatic carrier carriage 400 from the low pressure chemical vapor deposition system 301 to the stoker 200.

In FIG. 5, the host computer 100 communicates with the stoker 200 and the low pressure chemical vapor deposition system 301 via various signals such as control signals and request signals. The host computer 100 controls the automatic carrier carriage 400 based on the request signals from the stoker 200 and the low pressure chemical vapor deposition system 301, whereby the wafer lots are carried to the low pressure chemical vapor deposition system 301 under the control of the host computer 100. In this case, the loading request signal is sent from the low pressure chemical vapor deposition system 301 to the host computer 100, so that the host computer 100 retrieves whether or not the objective wafer lot is stored in the stoker 200. If the objective wafer lot is stored in the stoker 200, then the host computer 100 instructs the automatic carrier carriage 400 to carry the objective wafer lot from the stoker 200 low pressure chemical vapor deposition system 301.

In the low pressure chemical vapor deposition system 301, the four wafer lots form a single batch-unit. The low pressure chemical vapor deposition system 301 is capable of batch-processing the four or less wafer lots. As described above, the low pressure chemical vapor deposition system 301 has the internal tray 30 which is divided into a first tray 31 for storing wafer lots and a second ray 32 for storing other wafer lots. The wafer lots stored in the first tray 31 and the other wafer lots stored in the second ray 32 are alternately subjected to the batch-process. Each of the first and second trays 31 and 32 has a capacity of storing the four wafer lots as the maximum lot number.

The low pressure chemical vapor deposition system 301 performs the batch-processing to the wafer lots in accordance with the instruction from the host computer 100. The low pressure chemical vapor deposition system 301 is capable of sending a timing signal, which provides a notice of a predetermined timing, to the host computer 100 on the basis of the progress state. The low pressure chemical vapor deposition system 301 is capable of sending the host computer 100 an loading request for allowing the automatic carrier carriage 400 to carry the wafer lots to the low pressure chemical vapor deposition system 301 on the basis of the progress state. The low pressure chemical vapor deposition system 301 is capable of recognizing the wafer lot number of the wafers to be processed in the next time and now stored in the tray and also capable of judging whether or not the recognized wafer lot number reaches the maximum wafer lot number. The low pressure chemical vapor deposition system 301 is further capable of sending the host computer 100 an additional loading request signal for additionally input an additional wafer lot to the low pressure chemical vapor deposition system 301.

Figure 7:
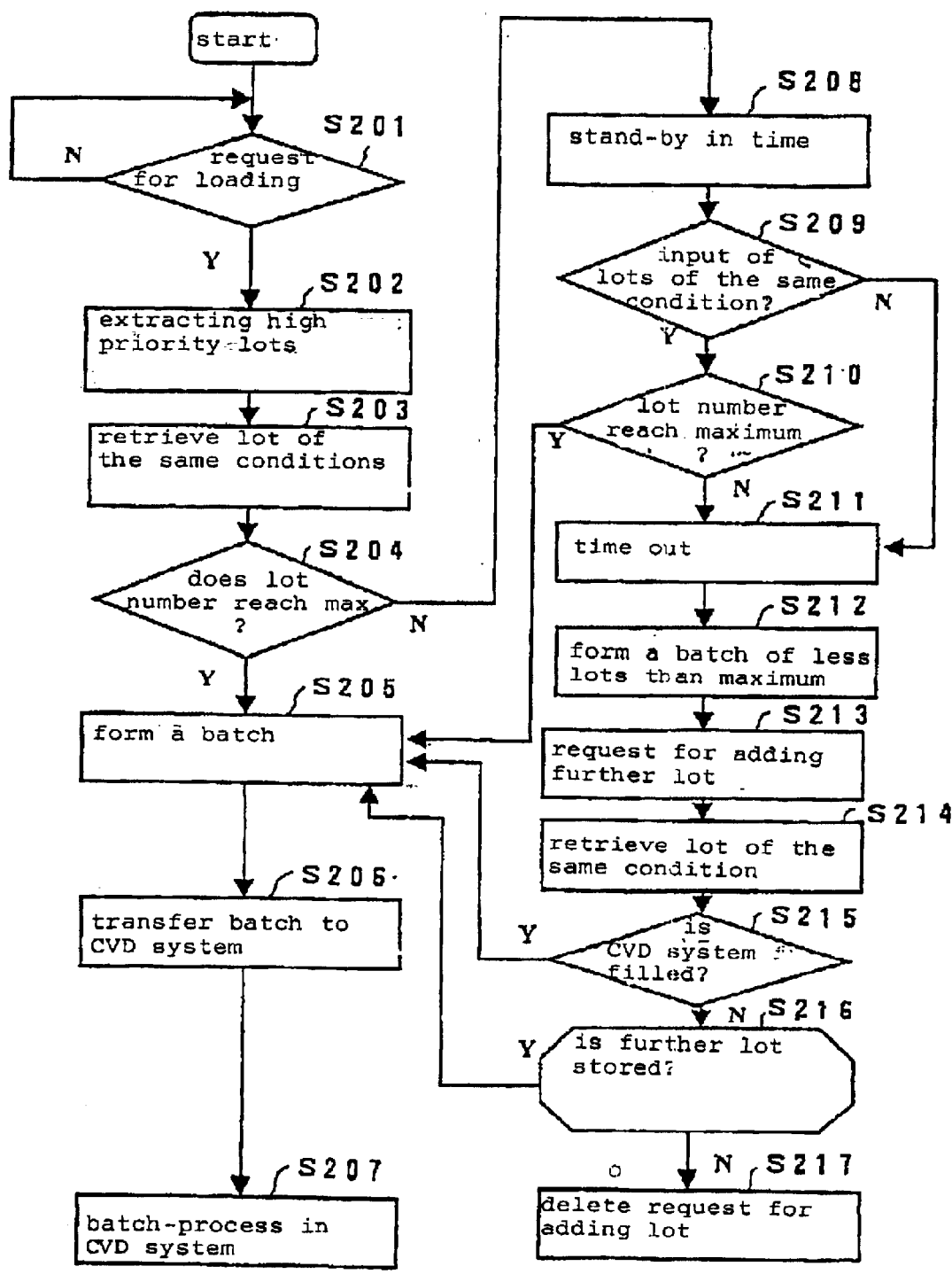
FIG. 7 is a flow chart illustrative of operations of the novel manufacturing management system for managing the low pressure chemical vapor deposition system, the stoker, and the automatic carrier carriage under the control of the host computer in the first embodiment in accordance with the present invention.
Figure 8:
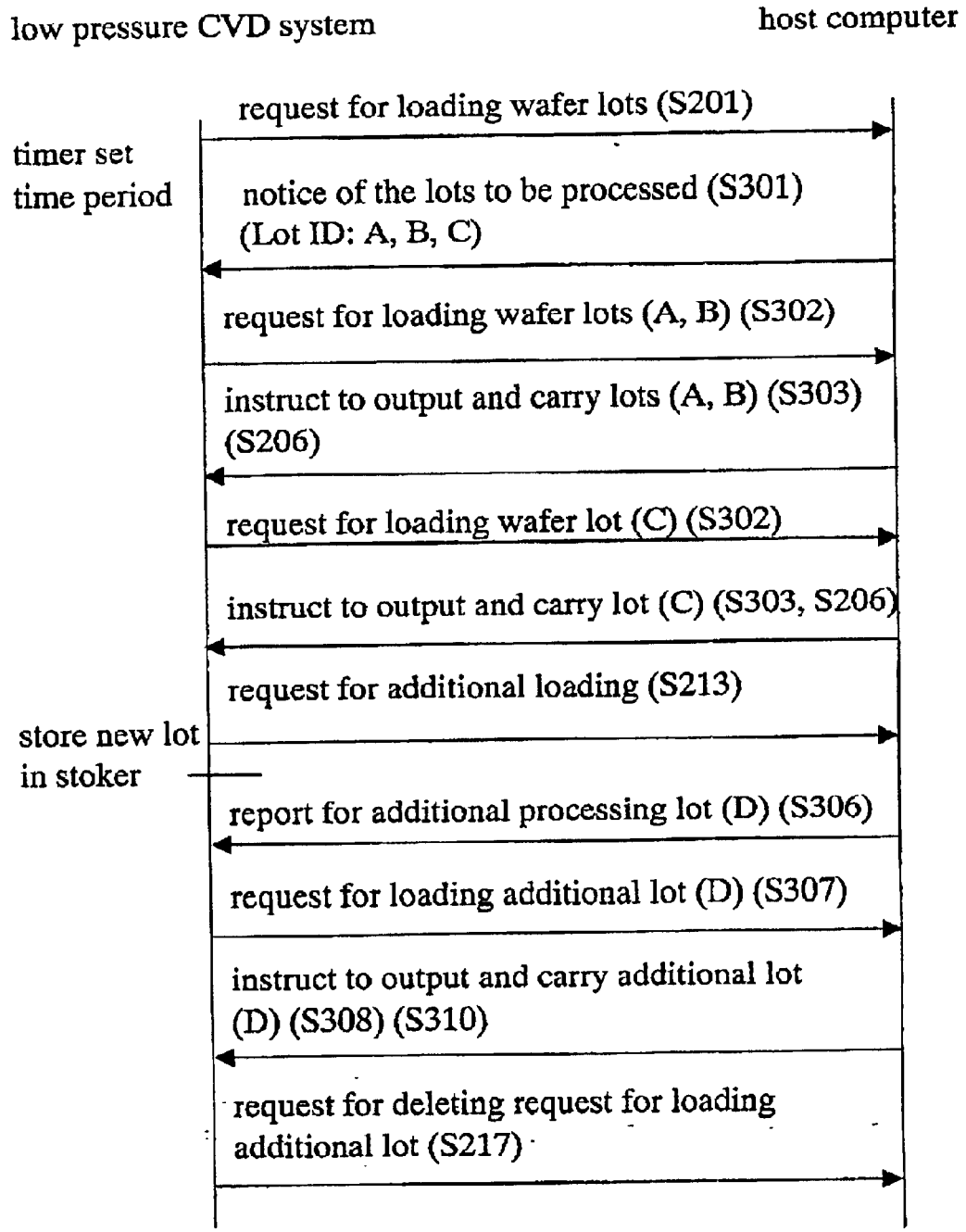
FIG. 8 is a timing chart illustrative of inter-relationships in transmissions of various requests, instructions and operations between the low pressure chemical vapor deposition system and the host computer in the first embodiment in accordance with the present invention.
Figure 9:
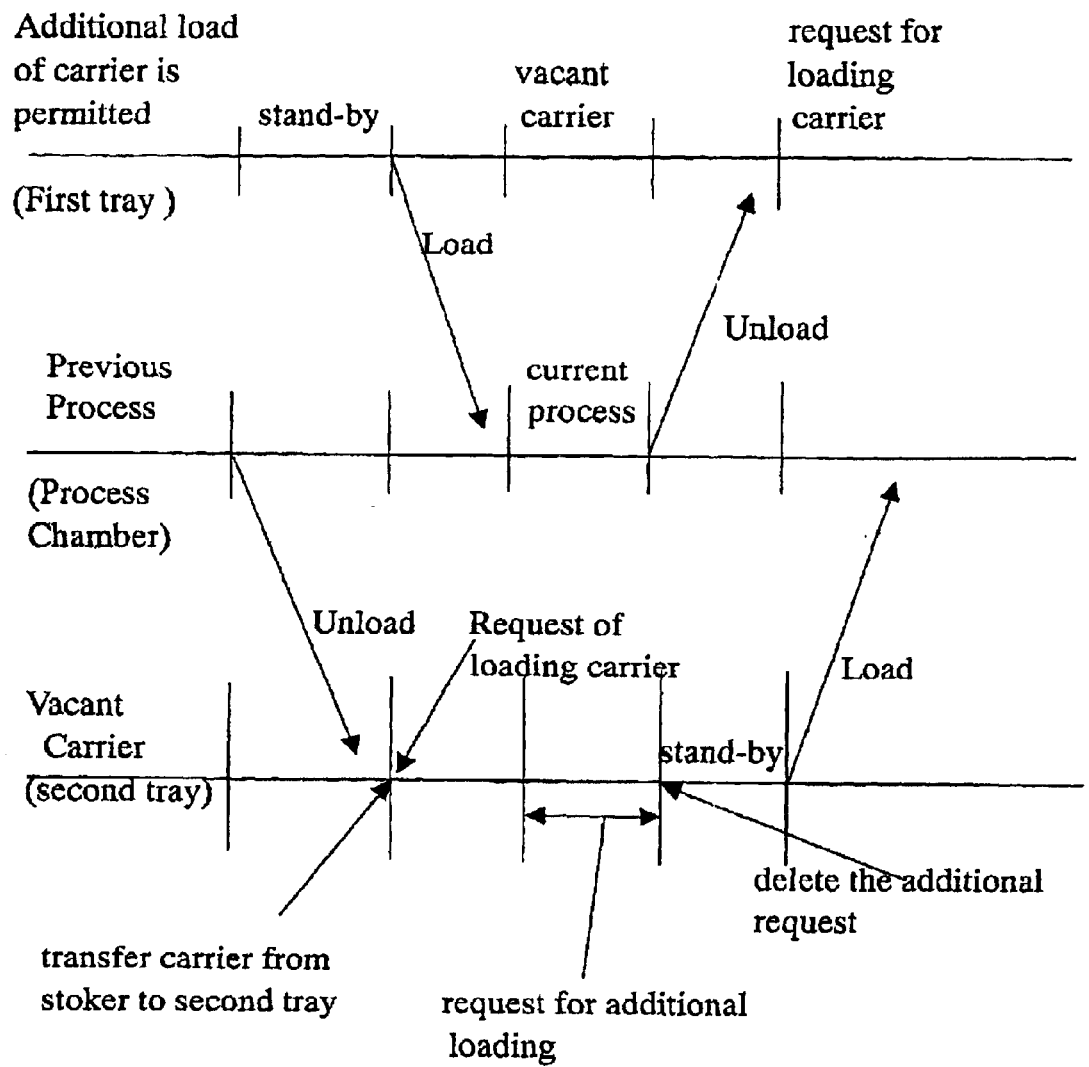
FIG. 9 is a diagram illustrative of operations of loading wafers from first or second trays to a non-illustrated deposition chamber and unloading the wafers from the deposition chamber to the first or second trays in the low pressure chemical vapor deposition system in the first embodiment in accordance with the present invention.

FIG. 7 is a flow chart illustrative of operations of the novel manufacturing management system for managing the low pressure chemical vapor deposition system, the stoker, and the automatic carrier carriage under the control of the host computer in the first embodiment in accordance with the present invention. FIG. 8 is a timing chart illustrative of inter-relationships in transmissions of various requests, instructions and operations between the low pressure chemical vapor deposition system and the host computer in the first embodiment in accordance with the present invention. FIG. 9 is a diagram illustrative of operations of loading wafers from first or second trays to a non-illustrated deposition chamber and unloading the wafers from the deposition chamber to the first or second trays in the low pressure chemical vapor deposition system in the first embodiment in accordance with the present invention. The low pressure chemical vapor deposition system 301, the stoker 200, and the automatic carrier carriage 400 are operated under the control of the host computer 100.

In a first step S201, the low pressure chemical vapor deposition system 301 transfers the wafer lots from the first tray 31 to the deposition chamber to start the chemical vapor deposition process. At this time, the low pressure chemical vapor deposition system 301 sends the host computer 100 an loading request for accommodating next wafer lots to be batch-processed in the next time into the second tray 32.

In a second step S202, upon receipt of the loading request, the host computer 100 selects and pick up wafer lots having a higher priority order from the stoker 200.

In a third step S203, the host computer 100 retrieves whether or not any further wafer lot, which may be batch-processed together with the selected wafer lots, remains in any stoker 200.

In a fourth step S204, if any wafer lot, which may be batch-processed together with the selected wafer lots, is present, then this wafer lot is once stored in the stoker 200 of the block, to which the low pressure chemical vapor deposition system 301 belongs. In this case, the wafer lots stored in the stoker in the other block is carried by a carrier carriage 500 to the stoker 200 of the block BL7, to which the low pressure chemical vapor deposition system 301 belongs. Thereafter, the host computer 100 recognizes the number of the wafer lots stored in the stoker 200 and forms a batch of the wafer lots.

In a fifth step S205, if the number of the wafer lots exceeds the maximum batch lot number, then the host computer 100 forms the batch of the higher priority ones of the wafer lots, wherein the number of the higher priority ones of the wafer lots is equal to the maximum batch lot number.

In a sixth step S301, the host computer 100 sends the low pressure chemical vapor deposition system 301 a notice of the selected wafer lots forming the batch.

In a seventh step S302, upon receipt of the notice from the host computer 100, the low pressure chemical vapor deposition system 301 sends the host computer 100 a load request.

In an eighth step S303, upon receipt of the load request, the host computer 100 sends the stoker 200 an instruction for outputting the wafer lots from the stoker 200.

In a ninth step S304, the host computer 100 sends the automatic carrier carriage 400 an instruction to carry the wafer lots from the stoker 200 to the low pressure chemical vapor deposition system 301.

In a tenth step S305, upon receipt of the carrying instruction, the automatic carrier carriage 400 carries the wafer lots to the low pressure chemical vapor deposition system 301 two by two, so that the wafer lots are stored in the second tray 32 for subsequent next chemical vapor deposition process. The low pressure chemical vapor deposition system 301 sends the host computer 100 the load request very times after the two wafer lots are carried to the low pressure chemical vapor deposition system 301.

In an eleventh step S306, the stoker 200 sends the host computer 100 a report for outputting the wafer lots from the stoker 200.

In a twelfth step S205, if the number of the selected wafer lots is less than the maximum batch lot number, then only the selected wafer lots form the batch.

In a thirteenth step S208, the host computer 100 makes a stand-by time period which is to be counted by a timer.

In a fourteenth step S209, the host computer 100 designates one of the stokers 200, into which the wafer lots are to be newly inputted, before the wafer lots are then carried by the automatic carrier carriage 400 to the designated stoker 200, so as to add the new wafer lots to the already-stored wafer lots in the stoker 200.

In a fifteenth step S210, the above fourteenth step will be repeated until the batch lot number reaches the maximum batch lot number or until the stand-by time period has expired, whichever event appears first.

In a sixteenth step S211, it is verified that if the batch lot number does reach or does not reach the maximum batch lot number even after the stand-by time period has already expired.

In a seventeenth step S212, even the batch lot number does not reach the maximum batch lot number, then the wafer lots forms a batch.

In an eighteenth step S301, the host computer 100 sends the low pressure chemical vapor deposition system 301 a notice to the effect that the wafer lots have formed the batch.

In a nineteenth step S302, upon receipt of the notice, the low pressure chemical vapor deposition system 301 sends the host computer 100 the load request. Upon receipt of the load request, the host computer 100 sends the automatic carrier carriage 400 the instruction to carry the wafer lots, so that the automatic carrier carriage 400 carries the wafer lots from the stoker 200 to the low pressure chemical vapor deposition system 301, wherein the automatic carrier carriage 400 carries two wafer lots at a time. In such a case as shown in FIG. 8, the three wafer lots "A", "B", and "C" are carried. The automatic carrier carriage 400 carries the wafer lots "A" and "B" at a first time. Thereafter, upon receipt of the load request, the automatic carrier carriage 400 carries the remaining wafer lot "C" at a second time. The low pressure chemical vapor deposition system 301 performs the batch process for the three wafer lots, the batch lot number of which is lower than the maximum batch lot number. This results in a lower efficiency in processing than the maximum process efficiency.

In a twentieth step S213, if the wafer lots, which batch lot number is lower than the maximum batch lot number, are carried to the low pressure chemical vapor deposition system 301 and then stored into the next time tray, for example, the second tray 32. The low pressure chemical vapor deposition system 301 recognizes that the tray has a further margin for further storing the wafer lot and then the low pressure chemical vapor deposition system 301 transmits an additional loading request to the host computer 100. The current batch process in the low pressure chemical vapor deposition process has been completed and then the next wafer lots in the first tray 31 are loaded into the deposition chamber. At this time, the timing signal is sent to the host computer 100 from the low pressure chemical vapor deposition system 301. The above additional loading request may continuously be sent from the low pressure chemical vapor deposition system 301 to the host computer 100 until the timing signal is sent to the host computer 100.

In a twenty first step S214, upon receipt of the additional loading signal, the host computer 100 retrieves whether or not that there is any wafer lot having the same process conditions as the wafer lots having formed the batch.

In a twenty second step S215, there is verified a stoker in which the additional wafer lot is stored.

In a twenty third step S306, the additional wafer lot is carried by the carrier carriage 500 to the stoker 200 of the block BL7 having the low pressure chemical vapor deposition system 301. The host computer 100 sends the low pressure chemical vapor deposition system 301 a notice to the effect that the additional wafer lot in accordance with the additional loading request has been verified. In this case, the host computer 100 is capable of retrieving the wafer lots which may be expected to be stored in the stoker after the other process in the other manufacturing apparatus but immediately thereafter.

In a twenty fourth step S307, the low pressure chemical vapor deposition system 301 recognizes that the timing signal has not been transmitted, before the low pressure chemical vapor deposition system 301 sends the host computer 100 the additional load request for storing the wafer lot to the second tray.

In a twenty fifth step S308, upon receipt of the additional load request, the host computer 100 sends the stoker 200 an additional output instruction to output the additional wafer lot from the stoker 200.

In a twenty sixth step S309, the host computer 100 sends the automatic carrier carriage 400 the additional carrier instruction.

In a twenty seventh step S310, the automatic carrier carriage 400 carries the wafer lot in the stoker 200 to the low pressure chemical vapor deposition system 301, and then the wafer lot is additionally stored in the second tray 32.

In a twenty eighth step S311, the stoker 200 sends the host computer 100 a report to the effect that the additional wafer lot has been outputted from the stoker 200. In this embodiment, the additional loading request is sent at one time. Notwithstanding, if the time still remains, and if the first time additional loading in accordance with the first time additional loading request results in that the wafer lot number in the second tray does not reach the maximum wafer lot number, then the low pressure chemical vapor deposition system 301 further sends the host computer 100 the further additional loading request, so that the host computer 100 further retrieves a further additional wafer lot. If the host computer 100 confirms the presence of the further additional wafer lot, then the host computer 100 sends the low pressure chemical vapor deposition system 301 the further additional notice of the further additional wafer lot, so that the further additional wafer lot is further added into the second tray 32.

In a twenty ninth step S216, if it is verified that upon the additional loading request from the low pressure chemical vapor deposition system 301, the wafer lot number of the second tray 32 reaches the maximum batch lot number, then the additional loading request is deleted.

In a thirtieth step S217, if it is verified that even the wafer lot number of the second tray 32 does not reach the maximum batch lot number and if the timing signal has been outputted, then the additional loading request is deleted. Particularly, the deletion to the additional loading request in this step is to stop any further additional loading of the wafer lot to the tray since the additional loading of the wafer lot is not in the time for the batch-processing by the low pressure chemical vapor deposition system 301.

As described above, the low pressure chemical vapor deposition system 301 judges whether or not the wafer lot number of the second tray 32 reaches the maximum batch lot number. If the wafer lot number does not reach the maximum batch lot number, then the additional loading request is outputted from the low pressure chemical vapor deposition system 301 to add an additional wafer lot to the second tray 32. The addition of the wafer lots may be allowed until the output of the timing signal for subsequent batch processing by the low pressure chemical vapor deposition system 301. The addition of the wafer lots increases the batch lot number and also improves the efficiency in processing the batch-processings.

In order to realize the additional loading of the wafer lots, the following steps are necessary. The low pressure chemical vapor deposition system 301 recognizes any wafer lot which may be added and then sends the host computer 100 the additional loading request. If the wafer lot number of the second tray 32 reaches the maximum batch lot number, or if the batch-process by the low pressure chemical vapor deposition system 301 is progressed to the predetermined step, then it becomes unnecessary to add the wafer lot to the tray. The low pressure chemical vapor deposition system 301 recognizes that the addition of the wafer lot to the tray becomes unnecessary, and the low pressure chemical vapor deposition system 301 sends the host computer 100 the request for deleting the additional loading request. The host computer 100 is required merely to retrieve the wafer lots allowable to be added during when the additional loading request remains effective and to control the transfer of the wafer lot to the low pressure chemical vapor deposition system. This means that the operational load of the host computer 100 is reduced and the necessary program is relatively simple. As shown in FIG. 4, the requirement for the performances and properties of the host computer is relaxed, and also the simplification to the program results in a reduction in the cost of the manufacturing system.

The host computer 100 receives an input of informations which indicate individual progresses in individual processes of the manufacturing apparatuses of the system, so that the host computer 100 grasps all of the states of the wafer lots. For those reasons, upon receipt of the additional loading request, the host computer 100 retrieves the wafer lots based on the informations having been inputted therein in accordance with the additional loading request. It is possible that wafer lots are manually stored into the stoker 200. In this case, the stoker 200 sends the host computer 200 the new information to the effect that the wafer lot has been stored into the stoker 200, so as to enable the host computer 100 to use those newly inputted information for subsequent operations to retrieve the wafer lots.

In the above described preferred embodiment, the manufacturing apparatus is the low pressure chemical vapor deposition system. It is, of course, possible as a modification that the manufacturing apparatus may be other batch-processing systems such as the diffusion apparatus and etching apparatus. In the above described preferred embodiment, the maximum batch lot number is 4. This umber is optional. Further, the automatic carrier carriage is capable of carrying two wafer lots at maximum. The maximum number of the wafer lots which are carried by the automatic carrier carriage may be optional.

As described above, the manufacturing apparatus for carrying out the batch-process judges whether or not the product lot number reaches the maximum batch-lot number. If the product lot number reaches the maximum batch-lot number, then the manufacturing apparatus outputs the additional loading request to the host computer so that the additional wafer lot is added to the batch to be processed by the manufacturing apparatus, in order to improve the efficiency of the process. In order to realize the additional loading of the product lots, the manufacturing apparatus recognizes the product lot, which may be added, and then sends the host computer the additional loading request. If the additional loading request becomes unnecessary, then the manufacturing apparatus sends the host computer the delete request for deleting the additional loading input request. For this reason, the host computer retrieves the product lot, which may be added, and then controls the carrier carriage in carrying the product lots to the manufacturing apparatus, whereby the operational load of the host computer is reduced, and the program for the host computer is also simplified. The requirement for improving the performance and the properties of the host computer is relaxed. The simplification of the program results in the reduction in cost of the system.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of managing manufacturing processes including at least a batch-process for a batch which comprises plural product lots by at least a batch-manufacturing apparatus, said method comprising the steps of:

transferring a loading request from the batch-manufacturing apparatus to a host computer;

retrieving batch-processable product lots by the host computer to form a batch of plural batch-processable product lots;

carrying the batch to the batch-manufacturing apparatus;

determined by the batch-manufacturing apparatus whether a number of the lots in the batch has reached a predetermined maximum;

sending an additional loading request from the batch-manufacturing apparatus to the host computer when the number of lots in the batch has not reached the predetermined maximum;

determining by the host computer whether any further additional batch-processable product lot is present; and carrying the additional batch-processable product lot to the batch-manufacturing apparatus to add the additional batch-processable product lot to the batch when the number of lots has not reached the predetermined maximum and the additional batch-processable product lot is present.

2. The method as claimed in claim 1, wherein the additional loading request is repeatedly sent to the host computer until the number of lots in the batch reaches the predetermined maximum.

3. The method as claimed in claim 1, wherein a delete request for deleting the additional loading request is sent from the batch-manufacturing apparatus to the host computer when the number of the lots in the batch reaches the predetermined maximum or when a transmission of the additional loading request is not in time for initiating the batch-process by the batch-manufacturing apparatus, whichever occurs first.

4. The method as claimed in claim 1, wherein the product comprises a semiconductor wafer, and one of the product lots comprises a plurality of the semiconductor wafer, and one of the batches comprises a plurality of the semiconductor wafer lot.

5. The method as claimed in claim 4, wherein said batch-manufacturing apparatus is capable of batch-processing the plural semiconductor wafers in the single batch.

6. A system for managing a manufacturing processes including at least a batch-process for a batch which comprises plural product lots, and said system comprising:

a host computer;

at least a batch-manufacturing apparatus for carrying out a batch-process under control of the host computer;

at least a stoker for storing the plural product lots;

at least a carrier for carrying the plural product lots between the batch-manufacturing apparatus and the stoker under control of the host computer;

wherein a loading request is transferred from the batch-manufacturing apparatus to a host computer, and the host computer retrieves batch-processable product lots to form a batch of plural batch-processable product lots, and the batch-manufacturing apparatus verifies whether a number of the lots in the batch reaches a predetermined maximum, and an additional loading request is sent from the batch-manufacturing apparatus to the host computer, when the predetermined maximum has not been reached, and the host computer determines whether any further additional batch-processable product lot is present, and the additional batch-processable product lot is carried to the batch-manufacturing apparatus to add the additional batch-processable product lot to the batch when the predetermined maximum has not been reached and the additional batch-processable product lot is present.

7. The system as claimed in claim 6, wherein the additional loading request is repeatedly sent to the host computer until the lot number of the batch reaches the predetermined maximum.

8. The system as claimed in claim 6, wherein a delete request for deleting the additional loading request is sent from the batch-manufacturing apparatus to the host computer either when the number of the lots in the batch reaches the predetermined maximum or when a transmission of the additional loading request is not in time for initiating the batch-process by the batch-manufacturing apparatus, whichever occurs first.

9. The system as claimed in claim 6, wherein the system has plural blocks, each of which has at least one of the stoker and the batch-manufacturing apparatus, and at least one of the carrier is allocated to each of the plural blocks, and the host computer retrieves the wafer lots in each of the plural blocks and also controls each of the carriers in each of the plural blocks.

10. The system as claimed in claim 6, wherein the product comprises a semiconductor wafer, and one of the product lots comprises a plurality of the semiconductor wafer, and one of the batches comprises a plurality of the semiconductor wafer lot.

11. The system as claimed in claim 10, wherein said batch-manufacturing apparatus is capable of batch-processing the plural semiconductor wafers in the single batch.

* * * * *